Feb. 21, 1950 R. A. ARTHUR 2,498,194
FLOW CONTROL VALVE
Filed April 2, 1945
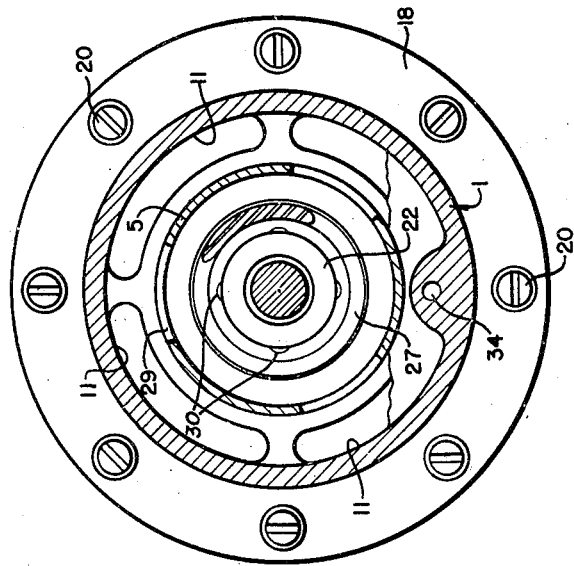
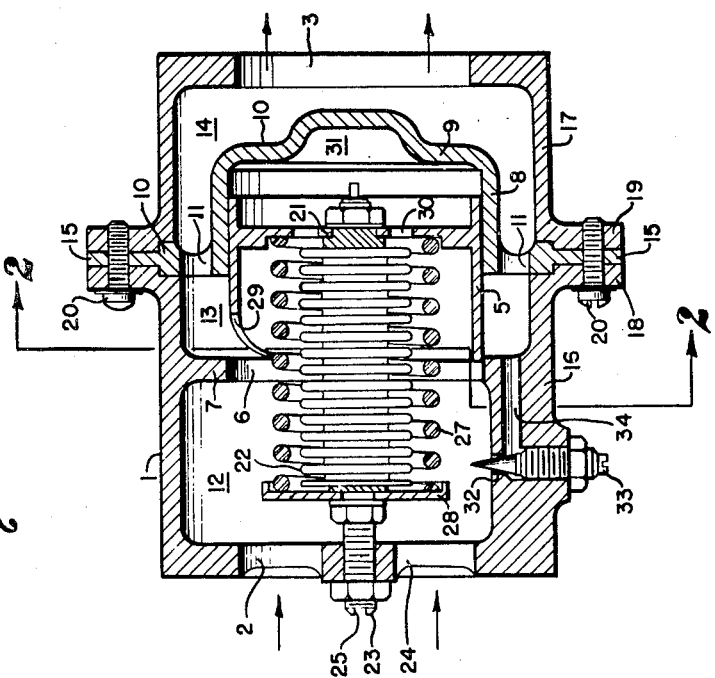
INVENTOR.
ROBERT A. ARTHUR
BY
ATTORNEY Patented Feb. 21, 1950.

2,498,194

UNITED STATES PATENT OFFICE 2,498,194

FLOW CONTROL VALVE

Robert A. Arthur, Santa Monica, Calif., assignor to The Garrett Corporation, Airesearch Manufacturing Company division, Los Angeles, Calif., a corporation of California Application April 2, 1945, Serial No. 586,145

5 Claims. (Cl. 236—92)

This invention relates to valves for quantitatively controlling the flow of fluid and is particularly useful in controlling the mass inflow of air into a cabin of an aircraft in which the pressure is kept under control.

In the pressurizing of aircraft cabins it is necessary not only to constantly regulate the pressure in the cabin as the plane changes altitude, but also to maintain an adequate ventilation of the cabin in order that the passengers may be supplied with a suitable quantity of fresh air. It is customary in the pressurization systems employed for this purpose to supply the cabin with air taken from the external atmosphere through a ram inlet, the mouth of which is forwardly directed, into which a portion of the volume of air met with by the plane in its forward flight is pushed. Pressure is developed in this inlet proportionate to the speed of the plane. These variations in pressure will be reflected in variations in density of the air entering the cabin. Consequently, in the absence of adequate control mechanism, there would be a variation in the mass flow or quantity of air being passed through the cabin in a given unit of time.

It is often necessary to regulate the temperature of the air entering the cabin. The compression of the air prior to introducing it into the cabin will heat it, to a considerable extent and where ambient temperature is already at a high level, it may be necessary to cool the air before it enters the cabin. On the other hand, where the plane is flying through extremely cold air, it may be necessary to heat the air before it is introduced into the cabin. Whenever such temperature control is necessary, and even under conditions not requiring temperature regulation, it is important that the mass flow of air passing through the cabin per unit of time be maintained at a sufficiently high level and yet not excessive. For example, it would be uneconomical to condition a greater flow of air than that required for adequate ventilation.

The general object of the present invention is to provide an improved mass flow regulator valve which is adapted to control the flow of air into an enclosure to a relatively uniform rate measured in weight flow per unit of time.

A further object is to provide a flow control valve which is responsive, not only to pressure, but also to temperature change so as to compensate for change in density produced by said temperature change.

Another object is to provide a flow control valve which, in addition to having the characteristics mentioned above, is of relatively simple and inexpensive construction.

A further object of the invention is to provide a flow control valve adapted to carry out the above described functions by mechanism self-contained therein and exposed to the air flowing therethrough.

A further object is to provide a flow control valve adapted to measure conditions causing flow (as contrasted to measuring the actual flow) and to thereby position the valve so as to provide an orifice which will pass the desired flow under said conditions thus measured.

Further objects and advantages of the invention will be brought out in the following part of the specification.

Referring to the drawing which is for illustrative purposes only,

Fig. 1 is a longitudinal sectional view of a valve embodying the invention; and

Fig. 2 is a transverse sectional view thereof taken on the line 2—2 of Fig. 1.

As an example of one form in which the invention may be embodied, I have shown in the drawing a flow control valve adapted to be mounted in the airflow inlet of an aircraft cabin. The valve comprises a casing 1 having an inlet 2 adapted to be connected to the inlet duct of the pressurizing system, through which air under pressure is moved to the cabin. The casing 1 is adapted to be mounted by any suitable means in an inlet opening in the cabin wall, with the outlet 3 communicating with the interior of the cabin.

Flow through the casing 1 is controlled by an axially shiftable valve element 5 which cooperates with a valve port 6 in a partition 7 in the casing 1. The valve element 5, which is preferably of cylindrical shape, is slidably mounted in a cylindric wall portion 8 of a cup-shaped central portion 9 of a partition 10, the latter having openings 11, through which the air flows. The casing is thus divided into an inlet compartment 12 communicating with the inlet 2, an intermediate compartment 13 communicating with the inlet compartment 12 through the valve port 6, and an outlet compartment 14 communicating with the outlet 3 and with the intermediate compartment 13 through the openings 11. The partition 10 is a separate member having a peripheral flange 15 and the casing 1 is formed in two sections 16 and 17 having flanges 18 and 19 respectively between which the flange 15 is secured by screws 20.

The valve element 5 has a web portion 21, by means of which it is attached to one end of a "Sylphon" bellows bulb 22. The other end of the bulb 22 is attached to a stud 23 which in turn is threaded into a spider 24 in which the inlet 2 is defined in the form of a series of circumferentially arranged apertures. The outer end of the stud 23 is provided with a slot 25 for cooperation with a screw driver, by means of which the stud 23 may be rotated to adjust the position of the bulb and valve element relative to the spider 24 at a given temperature and pressure. The bulb 22 and valve element 5, being rigidly attached together, will rotate as a unit with the stud 23, to which the bulb 22 is rigidly attached.

The bulb 22 is filled with a predetermined quantity of dry air or other gas, and together with spring 27 tends to move the valve element 5 toward an open position. Flow is determined by the pressure in the bellows and the setting of the valve 5 with respect to the port 6. Reduction of flow is then dependent upon pressure and temperature.

The valve element 5 has a rim, a portion of which lies in one plane and a portion of which has three cutaway areas 29, equidistantly spaced from each other so as to provide a gradual throttling or restricting effect as the valve moves toward closed position.

The web 21 is provided with openings 30 for the purpose of balancing the pressure in the chamber 31 (defined between the web 21 and the end wall of the cup portion 9) and the compartment 12.

A port 32, controlled by a needle valve 33, communicates with the compartment 12 and with a passage 34 which in turn communicates with the compartment 13.

In the operation of the valve, the bellows bulb 22 will respond to variations in pressure in the inlet chamber 12. In response to a rise in pressure, the bulb 22 will contract, moving the valve element 5 to a more closed position, and thereby throttling the flow. The consequent reduction in flow will compensate for the increased weight per volume of air passing through the valve and will thus regulate the flow, so as to maintain a substantially uniform weight per unit of time. A decrease in pressure in air in the inlet chamber 12 will permit the bellows to expand under the pressure of the spring 27, whereby the valve will be moved toward a more opened position.

An increase in temperature above a selected normal temperature will cause the bulb to expand and thereby increase the area of the valve opening above that which would be determined by pressure alone. This compensates for the expansion and consequent rarification of the air with an increase in temperature for any given pressure. Conversely, a decrease in temperature below the selected normal level will result in contraction of the bulb 22 and consequent restriction of the valve opening to an area below that which would be determined by air pressure alone. This will compensate for increasing density caused by the drop in temperature for any given pressure, and will result in maintenance of the mass flow at a uniform value.

Through adjustment of the stud 23, the valve may be preadjusted to the conditions under which it is designed to operate such as, for example, four pounds (by weight) of air per minute. The valve is designed to maintain this flow under all conditions of temperature and pressure which may be encountered in operation, even when the inlet pressure rises to such a value (for example, one hundred, twenty five pounds per square inch) that the valve will close completely. Under this condition, the desired flow is maintained by leakage past the valve element through the port 6, supplemented by bypass leakage through the bypassage 34, and the function of the needle valve 33 is to adjust this bypass leakage to an adequate amount to give the desired mass flow per minute at selected maximum inlet pressure and temperature.

The invention provides a valve which measures the conditions causing flow (rather than measuring the actual flow) and adjusts the valve orifice to provide a desired flow under such conditions. Such conditions comprise inlet pressure, temperature, and the area of the orifice (determined by inlet pressure and temperature).

The invention is particularly adaptable to controlling flow when the controlling conditions are in the supercritical range (the condition which prevails when pressure at the inlet 2 divided by pressure at the outlet 3 gives a ratio 1.89 for the type of valve shown). If the flow passage of the valve is of a Venturi shape, which it may be, this ratio for the supercritical range may range from 1.06 (minimum) upwardly.

The valve has its maximum utility under conditions wherein the inlet air pressure is in a supercritical condition with respect to the downstream pressure, and attains a more accurate control under these conditions.

I claim as my invention:

1. In a fluid flow control valve: a casing having an inlet at one end and an outlet at its other end; means extending inwardly from the outer wall of said casing and defining a valve port; a core member carried by said casing, spaced from said outer casing wall to define an annular passage forming a part of a flow passage through said casing from said inlet through said port and to said outlet, said core defining interiorly thereof a cylindrical chamber closed at one end and in axial registry with said port; a valve element slidably mounted in said chamber for cooperation with said port to regulate the flow of the fluid therethrough, said valve element being open under all normal operating conditions to continuously allow a flow of fluid through said port and having an opening therein for fluid communication into said chamber between said valve element and said closed end; and means for controlling said valve, said means including a fluid filled bellows extending axially through said port, one end of said bellows being attached to said valve element and the other end being anchored to said valve casing, and a coil spring encircling said bellows and under compression between said valve element and a part connected to said casing, said means being responsive to both pressure and temperature of the air flowing through said passage for moving said valve in such a manner as to decrease the valve opening upon the occurrence of either an increase in pressure or a decrease in temperature, and to increase the valve opening upon the occurrence of either a decrease in pressure or an increase in temperature.

2. In a fluid flow control valve: a casing having an inlet at one end and an outlet at its other end; means extending inwardly from the outer wall of said casing and defining a valve port; a core member carried by said casing, spaced from said outer casing wall to define an annular passage forming a part of a flow passage through said casing from said inlet through said port and to said outlet, said core defining interiorly thereof a cylindrical chamber closed at one end and in axial registry with said port; a valve element slidably mounted in said chamber for cooperation with said port to regulate the flow of the fluid therethrough, said valve element being open under all normal operating conditions to continuously allow a flow of fluid through said port and having an opening therein for fluid communication into said chamber between said valve element and said closed end; and means for controlling said valve, said means including a fluid filled bellows extending axially through said port, one end of said bellows being attached to said valve element; abutment means adjustably anchoring the other end of said bellows to said casing; and a coil spring under compression between said valve element and said abutment means, said means being responsive to both pressure and temperature of the air flowing through said passage for moving said valve in such a manner as to decrease the valve opening upon the occurrence of either an increase in pressure or a decrease in temperature, and to increase the valve opening upon the occurrence of either a decrease in pressure or an increase in temperature.

3. In a fluid flow control valve: a casing having an inlet at one end and an outlet at its other end; means extending inwardly from the outer wall of said casing and defining a valve port; a cylindrical valve element for operable cooperation with said port; a web portion for said valve element; a partition in said casing having openings therein for the passage of fluid therethrough, said partition having a central cup shaped portion, closed at one end and defining a cylinder within which the valve element is slidable, said valve element having a rim, a portion of which lies in one plane and a portion of which has a plurality of cut-away areas, equidistantly spaced from each other so as to provide a gradual throttling or restricting effect as the valve moves toward closed position; and a bellows having one end connected to the web portion of the valve element and the opposite end connected to a fixed support within the casing.

4. In a fluid flow control valve: a casing having an inlet at one end and an outlet at its other end; means extending inwardly from the outer wall of said casing and defining a valve port; a core member carried by said casing, spaced from said outer casing wall to define an annular passage forming a part of a flow passage through said casing from said inlet through said port and to said outlet, said core defining interiorly thereof a cylindrical chamber closed at one end and in axial registry with said port; a valve element slidably mounted in said chamber for cooperation with said port to regulate the flow of the fluid therethrough, said valve element being open under all normal operating conditions to continuously allow a flow of fluid through said port and having an opening therein for fluid communication into said chamber between said valve element and said closed end; and means for controlling said valve, said means including a fluid filled bellows extending axially through said port, one end of said bellows being attached to said valve element and the other end being anchored to said valve casing, a spring retainer, a coil spring encircling said bellows and under compression between said valve element and said spring retainer; and a screw for adjusting said spring, bellows and valve as a unit, said means being responsive to both pressure and temperature of the air flowing through said passage for moving said valve in such a manner as to decrease the valve opening upon the occurrence of either an increase in pressure or a decrease in temperature, and to increase the valve opening upon the occurrence of either a decrease in pressure or an increase in temperature.

5. In a fluid flow control valve: a casing having an inlet at one end and an outlet at its other end; means extending inwardly from the outer wall of said casing and defining a valve port; a core member carried by said casing, spaced from said outer casing wall to define an annular passage forming a part of a flow passage through said casing from said inlet through said port and to said outlet, said core defining interiorly thereof a cylindrical chamber closed at one end and in axial registry with said port; a valve element slidably mounted in said chamber for cooperation with said port to regulate the flow of the fluid therethrough, said valve element being open under all normal operating conditions to continuously allow a flow of fluid through said port and having an opening therein for fluid communication into said chamber between said valve element and said closed end; means for controlling said valve, said means including a fluid filled bellows extending axially through said port, one end of said bellows being attached to said valve element and the other end being anchored to said valve casing, and a coil spring encircling said bellows and under compression between said valve element and a part connected to said casing, said means being responsive to both pressure and temperature of the air flowing through said passage for moving said valve in such a manner as to decrease the valve opening upon the occurrence of either an increase in pressure or a decrease in temperature, and to increase the valve opening upon the occurrence of either a decrease in pressure or an increase in temperature; said casing having a supplementary passage formed therein extending through said inwardly extending port forming casing portion and adapted to permit a portion of the fluid flowing through said flow passage to bypass said port; and a manually adjustable valve for varying the amount of flow permitted through said bypass passage.

ROBERT A. ARTHUR.

REFERENCES CITED

The following references are of record in the file of this patent:

UNITED STATES PATENTS

| Number | Name | Date |
|---|---|---|
| 933,468 | Koenig | Sept. 7, 1909 |
| 942,112 | Sprecher | Dec. 27, 1909 |
| 990,772 | Pollard | Apr. 25, 1911 |
| 1,328,855 | Sweet | Jan. 27, 1920 |
| 1,472,412 | Goosmann | Oct. 30, 1923 |
| 1,585,732 | Otto | May 25, 1926 |
| 1,639,286 | Carson | Aug. 16, 1927 |
| 1,850,963 | Sponar | Mar. 22, 1932 |
| 1,897,559 | Kellogg | Feb. 14, 1933 |
| 2,002,057 | Gregg | May 21, 1935 |
| 2,052,769 | Hoesel | Sept. 1, 1936 |
| 2,079,579 | Shrode | May 4, 1937 |
| 2,155,950 | Nallinger | Apr. 25, 1939 |
| 2,290,838 | White | July 21, 1942 |
| 2,297,231 | Lichte | Sept. 29, 1942 |
| 2,353,889 | Giesler | July 18, 1944 |
| 2,361,227 | Mock | Oct. 24, 1944 |
| 2,376,711 | Mock | May 22, 1945 |
| 2,385,664 | Warner | Sept. 25, 1945 |

FOREIGN PATENTS

| Number | Country | Date |
|---|---|---|
| 97,257 | Sweden | Aug. 31, 1939 |
| 367,496 | Great Britain | Feb. 25, 1932 |
| 678,563 | France | Nov. 2, 1930 |